US008986086B2

(12) United States Patent
Carlson et al.

(10) Patent No.: US 8,986,086 B2
(45) Date of Patent: Mar. 24, 2015

(54) INSERT FOR AN OPENING

(75) Inventors: Daniel D. Carlson, Fenton, MI (US); Timothy M. Barnes, Fitchburg, MA (US)

(73) Assignee: TRW Automotive U.S. LLC, Livonia, MI (US)

( * ) Notice: Subject to any disclaimer, the term of this patent is extended or adjusted under 35 U.S.C. 154(b) by 1091 days.

(21) Appl. No.: 12/454,239

(22) Filed: May 14, 2009

(65) Prior Publication Data

US 2010/0291854 A1 Nov. 18, 2010

(51) Int. Cl.
*B60H 1/24* (2006.01)
*B60H 1/34* (2006.01)

(52) U.S. Cl.
CPC ........ *B60H 1/249* (2013.01); *B60H 2001/3492* (2013.01)
USPC ............... 454/162; 454/164; 454/165; 292/1; 292/87; 292/88; 292/146; 292/147

(58) Field of Classification Search
USPC ................. 454/162, 164–165; 292/1, 87–88, 292/146–147, 150–152; 361/679.58
See application file for complete search history.

(56) References Cited

U.S. PATENT DOCUMENTS

| | | | | |
|---|---|---|---|---|
| 4,344,646 A | * | 8/1982 | Michel | 292/87 |
| 4,588,105 A | * | 5/1986 | Schmitz et al. | 220/787 |
| 5,071,022 A | | 12/1991 | Sick | |
| 5,158,329 A | * | 10/1992 | Schlack | 292/87 |
| 5,344,226 A | * | 9/1994 | Lee | 312/334.47 |
| 5,411,163 A | * | 5/1995 | Gueret | 220/326 |
| 5,601,117 A | | 2/1997 | Lewis et al. | |
| 5,839,458 A | * | 11/1998 | Delcarson | 134/113 |
| 5,855,349 A | * | 1/1999 | Nini et al. | 248/429 |
| 5,904,618 A | * | 5/1999 | Lewis | 454/162 |
| 6,210,266 B1 | * | 4/2001 | Barton | 454/162 |
| 6,474,703 B1 | * | 11/2002 | Berg | 292/200 |
| 7,077,742 B2 | | 7/2006 | Stevenson et al. | |
| 7,552,954 B2 | * | 6/2009 | Rozo et al. | 292/336.3 |
| 2003/0099094 A1 | * | 5/2003 | Coles et al. | 361/726 |
| 2004/0189014 A1 | * | 9/2004 | Harkins | 292/164 |
| 2006/0094281 A1 | * | 5/2006 | Dang | 439/352 |
| 2006/0186130 A1 | | 8/2006 | Jatzke et al. | |
| 2008/0045135 A1 | * | 2/2008 | Pfannenberg | 454/184 |
| 2008/0258478 A1 | * | 10/2008 | Lopez et al. | 292/251.5 |
| 2008/0268763 A1 | * | 10/2008 | Dippel | 454/152 |
| 2009/0023379 A1 | * | 1/2009 | Bredahl et al. | 454/267 |
| 2009/0173009 A1 | * | 7/2009 | Garries et al. | 49/176 |

FOREIGN PATENT DOCUMENTS

| | | |
|---|---|---|
| EP | 0 306 073 | 3/1989 |
| EP | 1584508 | 7/2008 |
| WO | 2006068565 | 6/2008 |

* cited by examiner

*Primary Examiner* — Steven B McAllister
*Assistant Examiner* — Ko-Wei Lin
(74) *Attorney, Agent, or Firm* — Tarolli, Sundheim, Covell & Tummino LLP

(57) ABSTRACT

An insert (10) for an opening in a base (20) includes a housing (12) having a peripheral side wall (18) defining an interior space (24). The peripheral side wall (18) includes at least one latch member (90) having a latching position. The latch member (90) engages the base (20) to secure the housing (12) in the opening when the latch member (90) is in the latching position. The housing (12) is inserted into the opening in a first direction (A) to engage the latch member (90) with the base (20). At least one indicator (100) shows when the at least one latch member (90) is in the latching position. The indicator (100) is visible in the first direction (A) when the insert (10) is in the opening in the base (20).

29 Claims, 7 Drawing Sheets

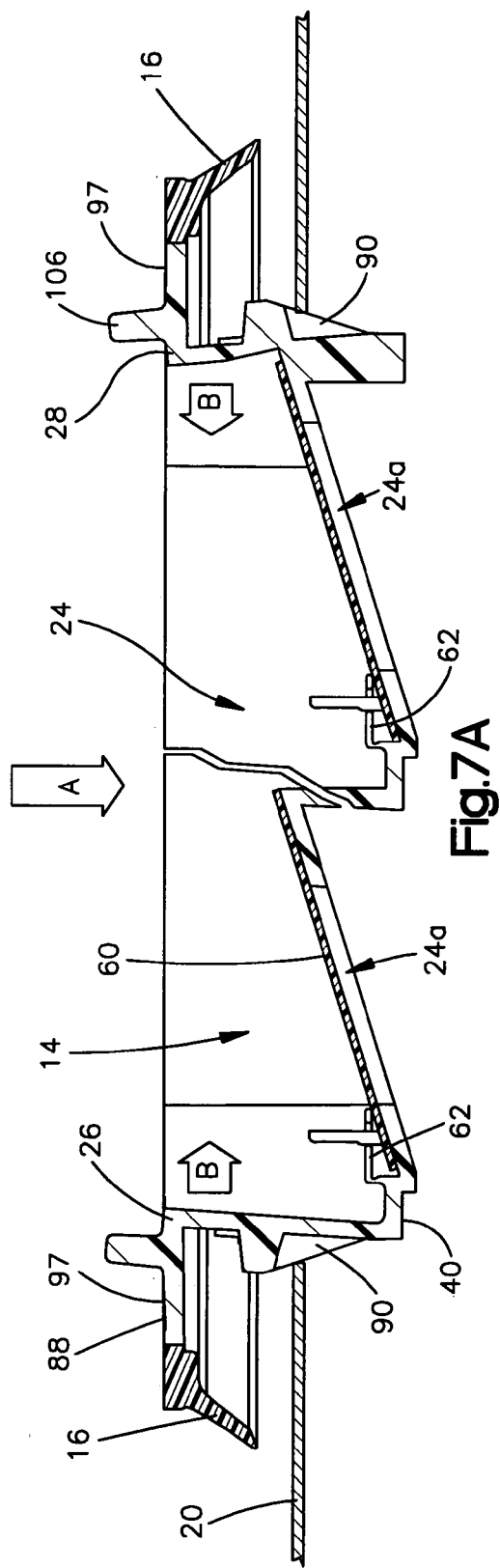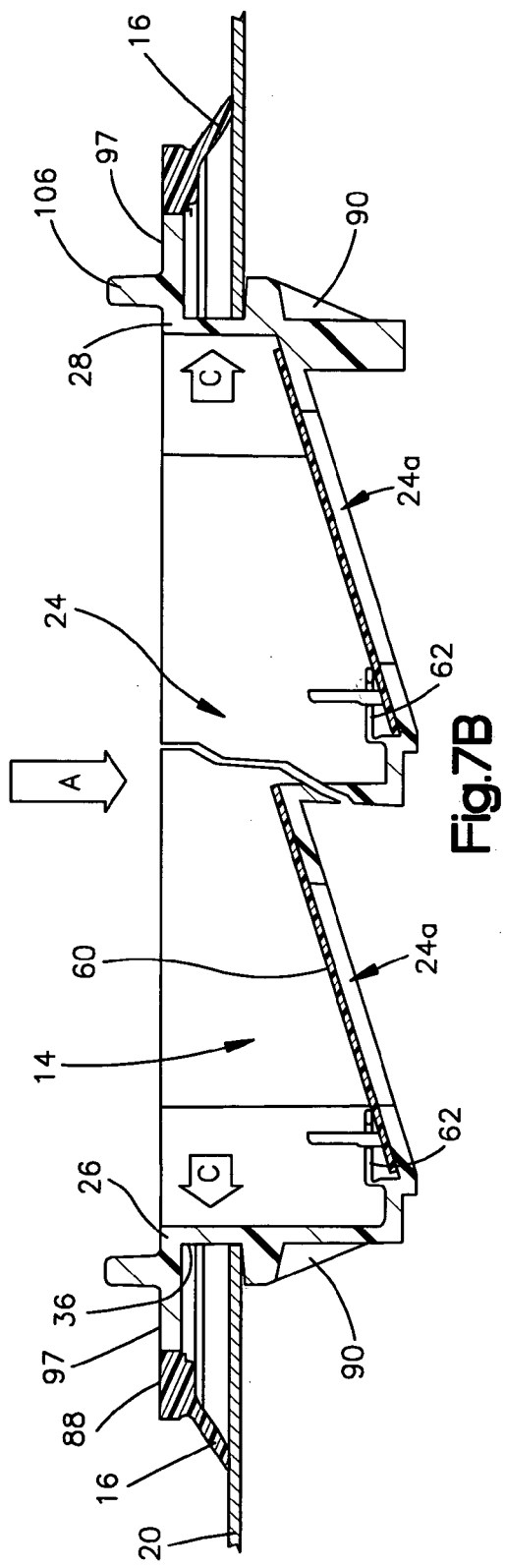

INSERT FOR AN OPENING

TECHNICAL FIELD

The present invention is directed to inserts for openings and more particularly, to a pressure relief valve or a plug for an opening in a motor vehicle.

BACKGROUND OF THE INVENTION

Pressure relief valves are widely used in motor vehicles to relieve air pressure surges or peaks in the passenger compartment which result for example, when the doors are slammed shut. The valves generally comprise a simple rigid frame or housing which mounts in an aperture in a vehicle body panel. A valve element in the form of a normally flexible plastic flap is connected to the frame to overlie the aperture in the vehicle body panel. The valve element opens relative to the frame to uncover the aperture to relieve air pressure surges.

The pressure relief valve typically includes latches for securing the valve to the motor vehicle. When installing the pressure relief valve, however, these latches are not visible to assembly line workers. Accordingly, there is no confirmation or feedback that the latches in fact engaged the motor vehicle during installation. There exists a need for pressure relief valves to include visual feedback such that assembly line workers installing the pressure relief valve into a motor vehicle can tell whether or not the latches are fully engaged with the motor vehicle. It is desirable that this feedback does not affect or compromise the ability of the part to seal out contaminants.

SUMMARY OF THE INVENTION

In accordance with the present invention, an insert for an opening in a base includes a housing having a peripheral side wall defining an interior space. The peripheral side wall includes at least one latch member having a latching position. The latch member engages the base to secure the housing in the opening when the latch member is in the latching position. The housing is inserted into the opening in a first direction to engage the latch member with the base. At least one indicator shows when the at least one latch member is in the latching position. The indicator is visible in the first direction when the insert is in the opening in the base.

In accordance with another embodiment of the present invention, an insert for an opening in a base includes a housing having a peripheral side wall defining an interior space and at least one latch member having a latching position. The latch member engages the base to secure the housing in the opening when the latch member is in the latching position. The housing is inserted into the opening in a first direction to engage the at least one latch member with the base. The peripheral side wall has a portion facing opposite the first direction that is engaged to move the latch member out of the latching position to remove the housing from the opening in a second direction opposite the first direction.

In accordance with another embodiment of the present invention, an insert for an opening in a base includes a housing having a peripheral side wall defining an interior space. The peripheral side wall includes a first portion and a second portion moving relative to the first portion. At least one latch member is disposed on the second portion and has a latching position. The latch member engages the base to secure the housing in the opening when the latch member is in the latching position. The housing is inserted into the opening in a first direction to engage the at least one latch member with the base. The second portion of the peripheral side wall has a first condition inward of the first portion to allow the housing to be inserted into the opening and a second condition substantially aligned with the first portion to place the at least one latch member in the latching position and secure the housing in the opening. The second portion moves from the first condition to the second condition as the housing is inserted into the opening along the first direction.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 7A is a sectional view of the pressure relief valve of FIG. 2 during installation into the motor vehicle;

FIG. 7B is a sectional view of the pressure relief valve of FIG. 2 installed in the motor vehicle;

DETAILED DESCRIPTION

Figure 1:
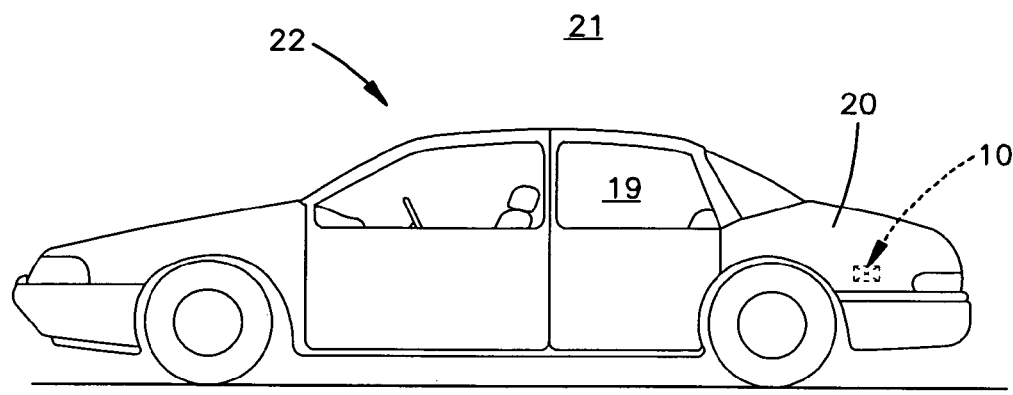
FIG. 1 is a schematic illustration of a motor vehicle with a pressure relief valve in accordance with the present invention.

The present invention is directed to inserts for openings and more particularly, is directed to an insert, such as a pressure relief valve or plug, for an opening in a base, such as a panel in a motor vehicle. FIG. 1 shows a schematic view of an insert or a pressure relief valve 10 located in an aperture of a vertical body panel 20 of a motor vehicle 22 in accordance with the present invention. The pressure relief valve 10 can have alternative locations in the vehicle 22. According to the embodiment in FIG. 1, the pressure relief valve 10 is located in the area of the vehicle trunk that is connected to the passenger compartment 19. In particular, the pressure relief valve 10 is designed to be mounted on the vertical panel 20 of the vehicle 22.

Figure 2:
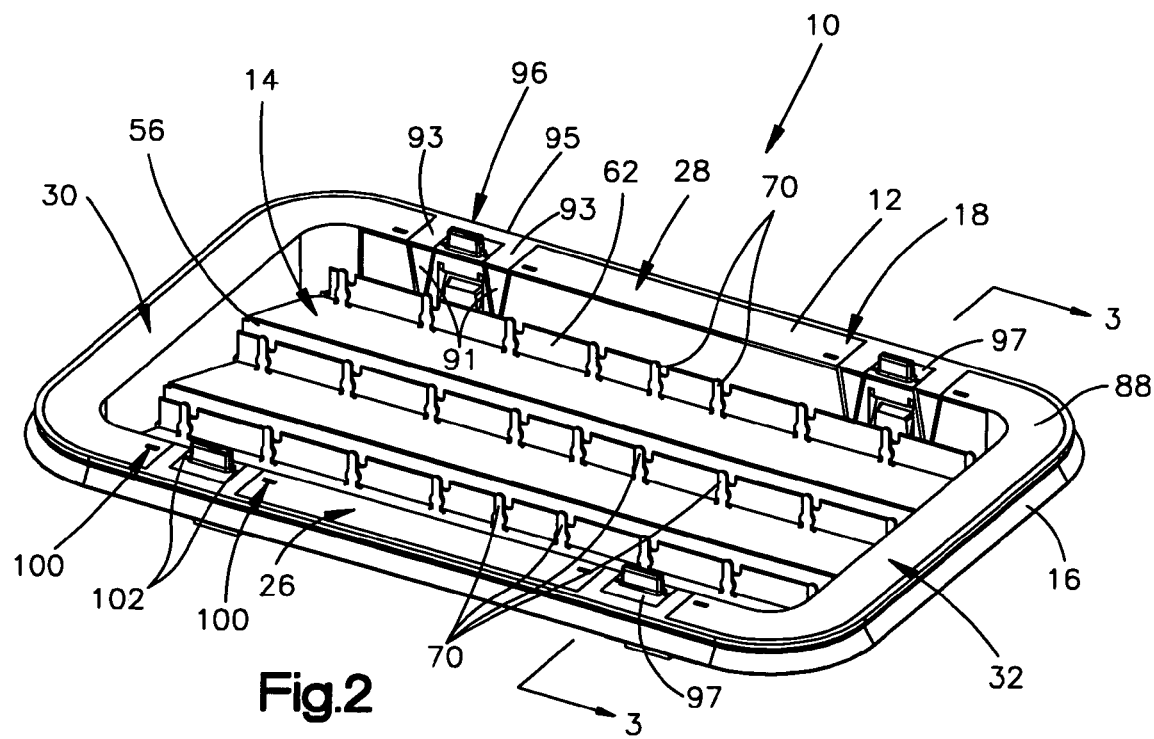
FIG. 2 is a schematic illustration of the pressure relief valve of FIG. 1.

As shown in FIG. 2, the pressure relief valve 10 includes a housing 12, at least one flap valve element 14, and a seal 16. Although the housing 12 is illustrated as having a generally rectangular construction, it should be understood that the housing can have any geometry including, for example, square, triangular, polygonal, elliptical, circular, etc. The housing 12 (FIG. 3) includes a peripheral side wall 18 that extends around the perimeter of the housing and defines a central air flow passage 24. The central air flow passage 24 connects a passenger compartment 19 of the vehicle 22 with the atmosphere 21 outside the vehicle and establishes an equalized air pressure between the passenger compartment and the atmosphere (FIG. 1).

The side wall 18 of the housing 12 includes four side wall sections connected together. First and second longer side wall sections 26, 28 extend parallel to each other. First and second shorter side wall sections 30, 32 extend parallel to each other and perpendicular to the first and second longer side wall sections 26, 28. A flange 88 extends outwardly from the side walls 26, 28, 30, 32 and substantially perpendicular to the side walls. The seal 16 is connected to the periphery of the flange 88. The seal 16 extends at an angle relative to the flange 88.

Each of the first and second longer side wall sections 26, 28 (FIG. 3) has inner and outer surfaces 34, 36 spaced apart from each other and top and bottom surfaces 38, 40 that connect the inner and outer surfaces. Likewise, each of the first and second shorter side wall sections 30, 32 has inner and outer surfaces (not shown) spaced apart from each other and connected by top and bottom surfaces (not shown). The inner surfaces of the shorter side wall sections 30, 32 cooperate with the inner surfaces 34, 36 of the longer side wall sections 26, 28 to define the central airflow passage 24 through the housing 12.

Figure 3:
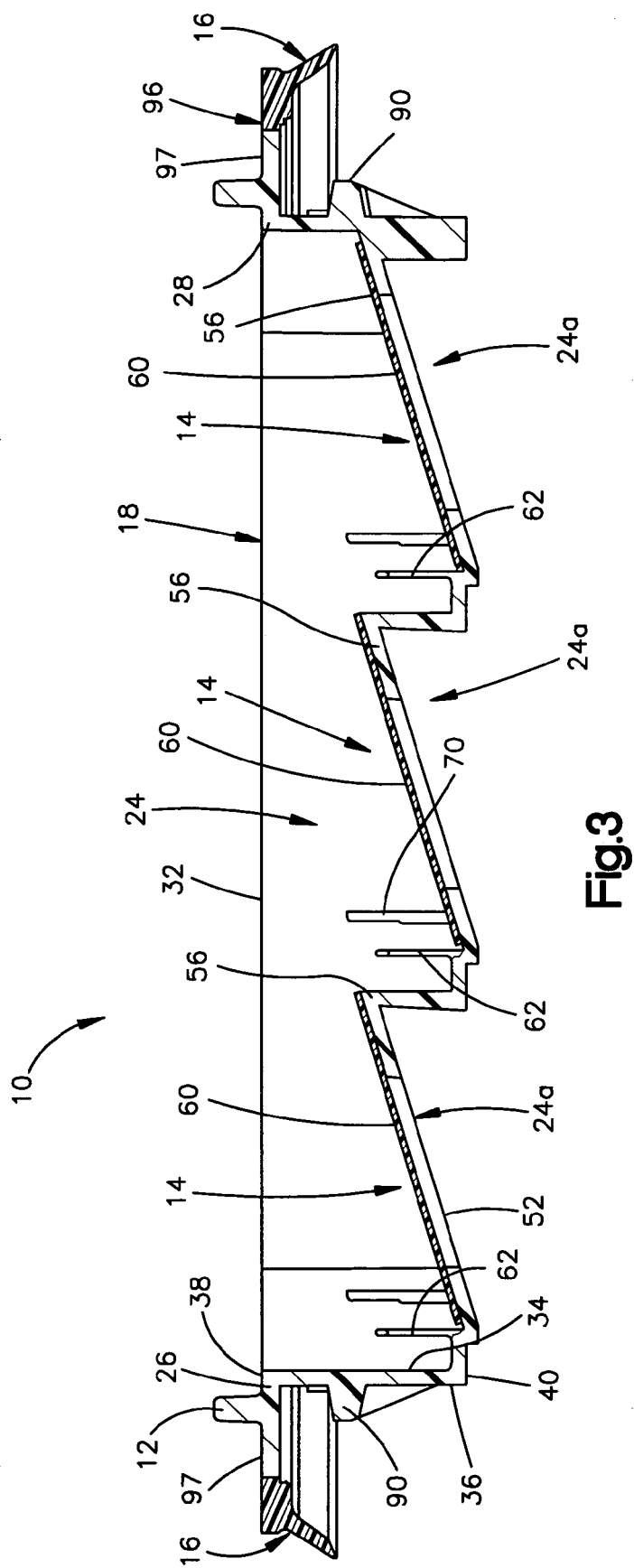
FIG. 3 is a section view of the pressure relief valve of FIG. 2 taken along line 3-3.

The frame 18 further includes one or more internal sub-frame assemblies or members 52 that are positioned to extend transversely relative to the side walls 26, 28, 30, 32 of the frame, as shown in FIG. 3. Each sub-frame 52 has a generally rectangular construction that defines a flow opening 24*a* along the central air flow passage 24. Although three sub-frame assemblies 52 and corresponding flow openings 24*a* are illustrated, those having ordinary skill will appreciate that there could be more or fewer sub-frames and corresponding flow openings, including zero if the insert 10 is a plug for closing the aperture in the vehicle body panel 20.

The sub-frames 52 are integrally formed with the frame 18 and lie at the angle shown relative to the top and bottom surfaces 38, 40 of the walls 26, 28. Each sub-frame 52 includes a planar valve seat defining portion 56. A flexible valve flap element 60 is connected to each sub-frame 52 and is sized to engage peripherally about the flow opening 24*a* in the associated sub-frame. The flap element 60 selectively engages the seat portion 56 to overlie, and thereby close, the associated flow opening 24*a*. FIGS. 2-3 illustrate the flap elements 60 in the closed position. Together, the sub-frame(s) 52 and the flap element(s) 60 block the entire central air flow passage 24.

As shown in FIGS. 2-3, retainer bars 62 on the frame 18 and retainer pins 70 on the sub-frame 52 cooperate to secure each flap element 60 to the associated sub-frame. The retainer pins 70 extend away from the sub-frame 52 and are spaced along the sub-frame substantially parallel to the longer side walls 26, 28. The retainer bar 62 is a plastic bar member of relatively rigid construction integrally molded with the frame 18 and extending generally parallel to the longer side walls 26, 28 of the frame 18. Those having ordinary skill will appreciate that the retainer bar 62 may have a unitary construction or constitute a series of discrete portions extending between the longer side walls 26, 28.

The retainer bar 62 (FIG. 4) includes a first end 64 integrally molded with the frame 18 and a second end 66 having slot-like orifices 68 corresponding to the location and spacing of the associated retaining pins 70 extending from the sub-frame 52. Each of the orifices 68 is sized to receive one of the retaining pins 70.

Figure 4:
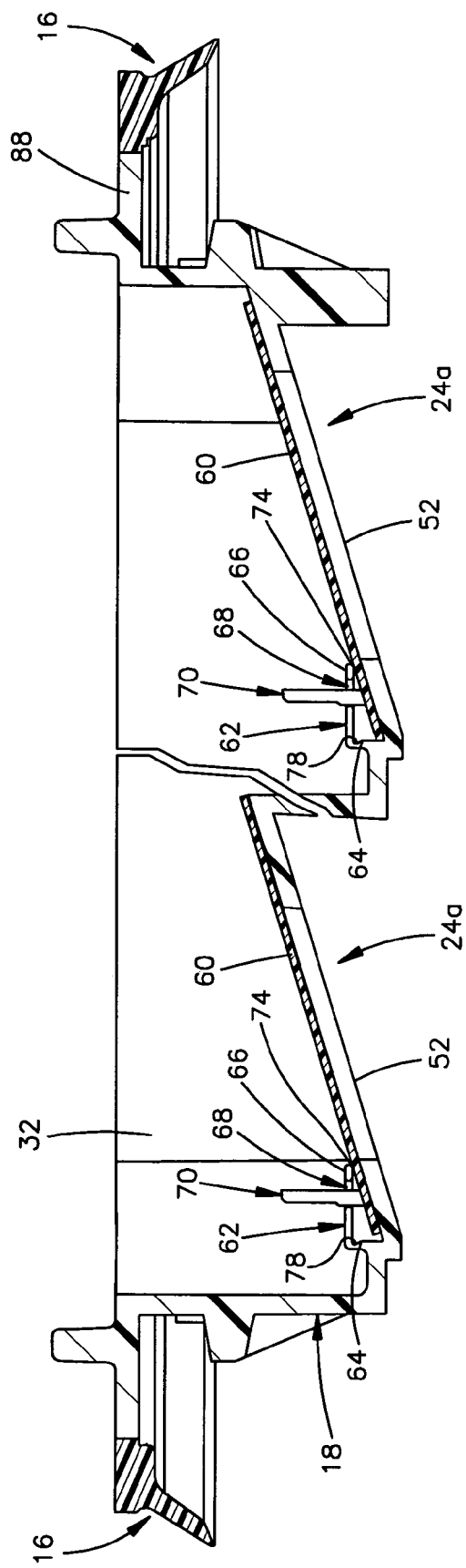
FIG. 4 is a side view of the pressure relief valve of FIG. 3 in which valve elements are secured to the pressure relief valve.

The retainer bar 62 has a first, initial condition in which the first end 64 and the second end 66 extend substantially parallel to the side walls 26, 28 of the frame 18 (FIG. 3) and a second condition in which the second end of the retainer bar extends transverse to the end walls of the frame as shown in FIG. 4. By placing the retainer bar 62 in the second condition, the retainer bar secures the flap element 60 to each sub-frame 52, as will be hereafter described.

In order to facilitate movement of the retainer bar 62 from the first condition to the second condition, the first end 64 of the retainer bar includes a reduced thickness portion 78 (FIG. 4). The portion 78 acts as a living hinge 80 to pivotally join the first end 64 of the retainer bar 62 to the frame 18. The pivotal connection allows the first end 64 to remain substantially parallel to the side walls 26, 28 and connected to the second end 66 while the second end is positioned transverse to the side walls.

Figure 5A:
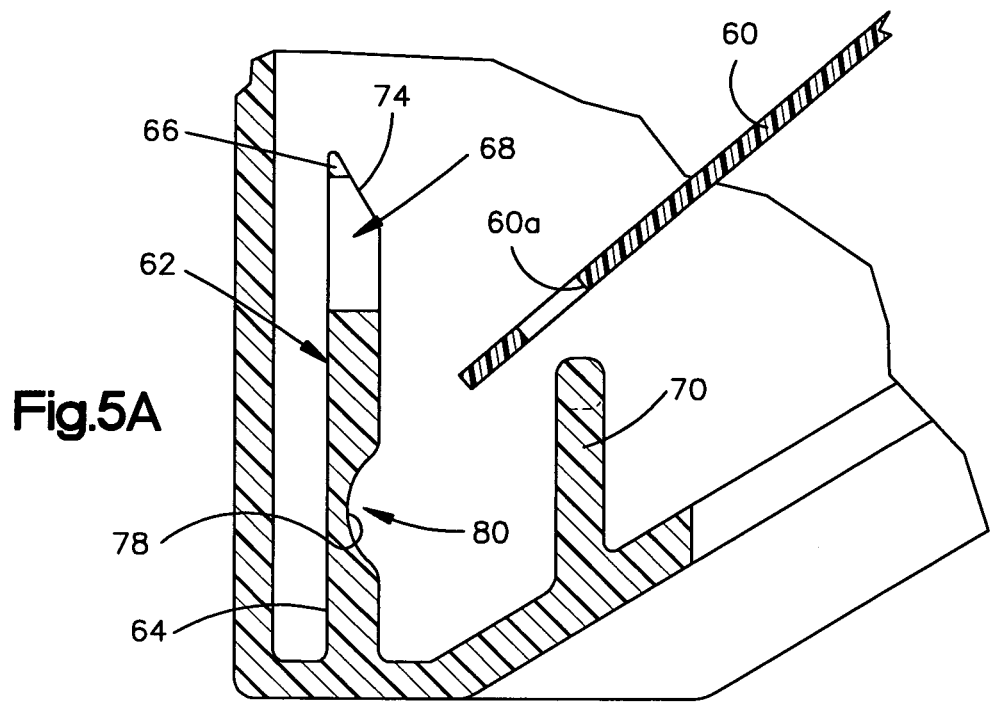
FIG. 5A is an enlarged view of the pressure relief valve of FIG. 4 during a first step of installation of the valve element in the pressure relief valve.
Figure 5B:
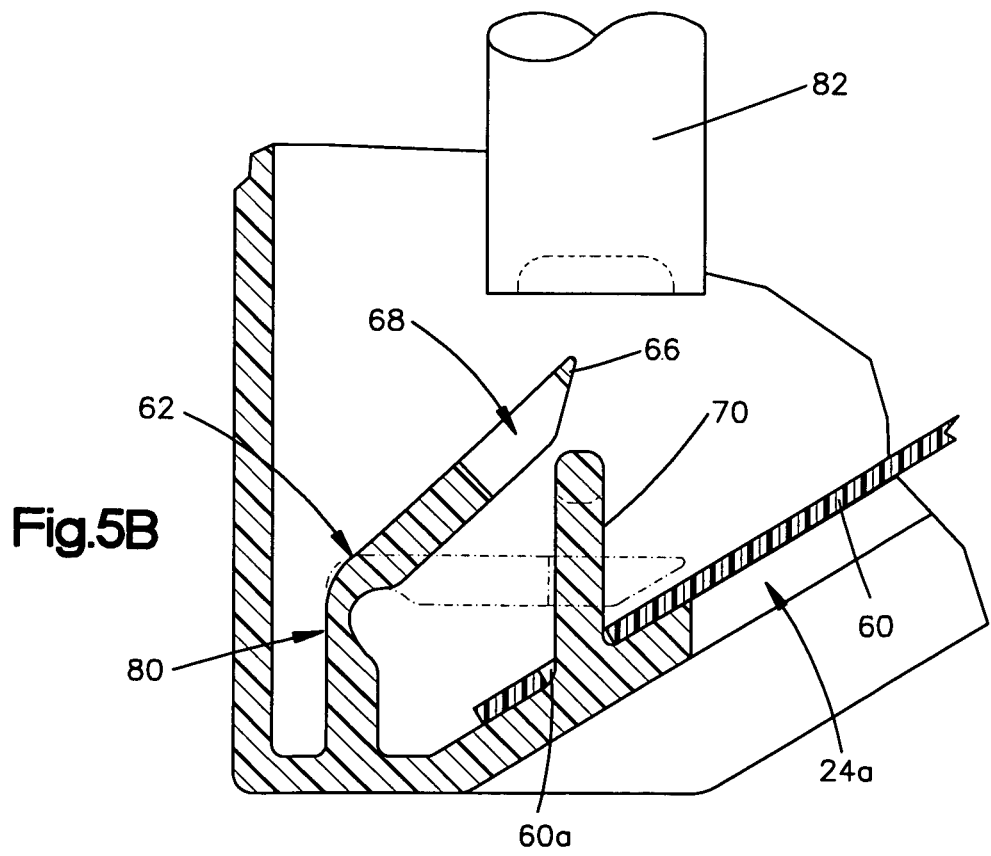
FIG. 5B is an enlarged view of the pressure relief valve of FIG. 4 during a second step of installation of the valve element in the pressure relief valve.
Figure 5C:
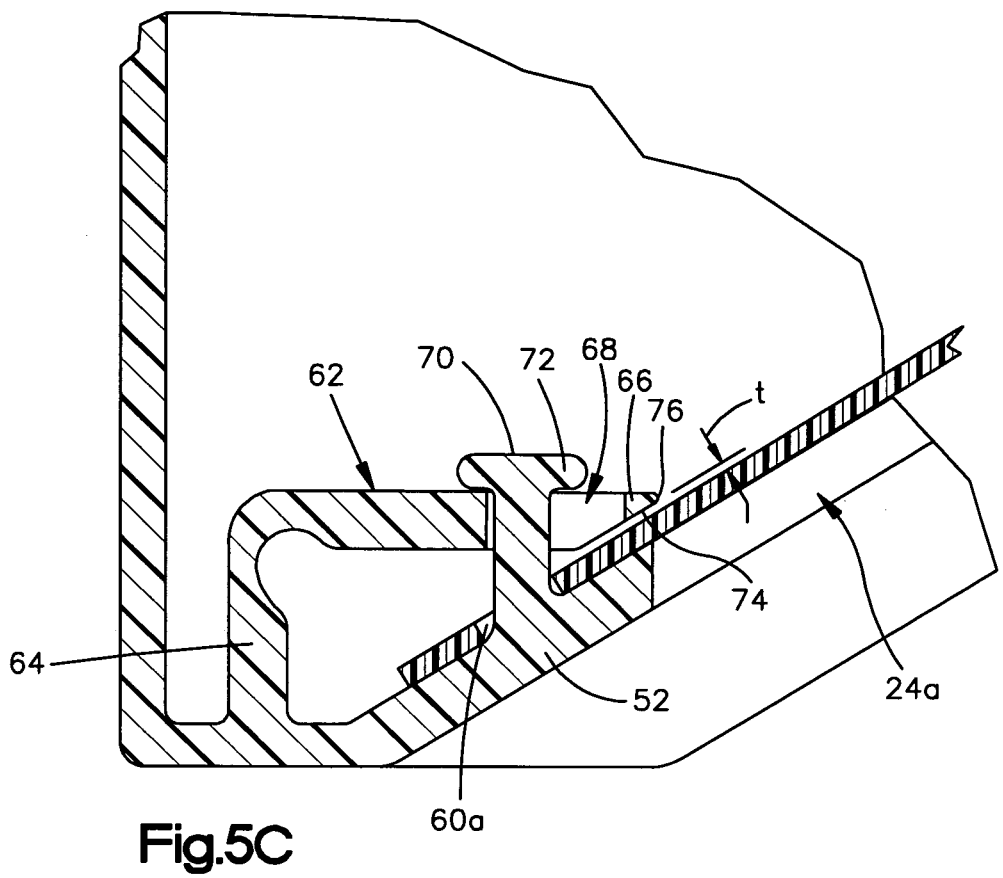
FIG. 5C is an enlarged view of the pressure relief valve of FIG. 4 during a third step of installation of the valve element in the pressure relief valve.

Referring now to FIGS. 5A-C, as previously mentioned, the retainer bar 62 is integrally molded with frame 18 initially in an extended position as generally shown in FIG. 5A. During assembly, the flap element 60 is first positioned on the retaining pins 70 so that the retaining pins are received into corresponding apertures 60*a* of the flap element. This places the flap element 60 onto the sub-frame 52 in an overlying fashion in which the flap element engages the portion 56 of the sub-frame and covers the associated flow opening 24*a*. The second end 66 of retainer bar 62 is then bent, via the living hinge 80, relative to the first end 64 to assume the desired position (shown in dotted lines in FIG. 5B) relative to the retaining pin 70. In particular, the bending of the second end 66 of the retainer bar 62 causes the retaining pins 70 to extend through the slot-like orifices 68 of the retainer bar. This places the retainer bar 62 in the second condition extending transverse to the side walls 26, 28 of the frame 18.

Many types of fasteners or even snap connections could be used to retain or lock the retaining bar 62 in the second condition relative to pins 70. In the subject embodiment, however, a cold staking process, implemented with assembly tool 82, is undertaken to form a locking cap 72 on one or more of the pins 70 (FIG. 5B). As a result, the retaining bar 62 is locked into place so that the flap element 60 is prevented from disengaging from the pins 70 on the sub-frame 52 (FIG. 5C).

As shown in FIG. 5C, the second end 66 of the retainer bar 62 has a tapered and inclined surface 74 that generally corresponds to the incline of the associated valve seat portion 56 of the sub-frame 52 when the retainer bar is in the second condition. When the retaining bar 62 is locked in place, the surface 74 of retainer bar is positioned to overlie both the sub-frame 52 and a portion of the flap element 60 without overlying any of the flow opening 24*a*. The surface 74 is spaced from the flap element 60 a distance "t" to ensure that the surface does not clampingly engage the flap element when the retainer bar 62 is locked in the second condition. In addition, the second end 66 of the retainer bar 62 terminates with a gentle rounded configuration as shown at 76. In combination, the rounded end 76 and the position of the surface 74 relative to the flap element 60 allows for pivotal movement of the flap element relative to the sub-frame 52.

Once the insert or pressure relief valve 10 is inserted and installed within the body panel 20 of the vehicle 22, when an over-pressure condition exists on the right or upstream side of the flap elements 60, the flap elements are pivoted away from the associated seat portion 56 of the sub-frame 52 to an open condition (not shown). The open condition of the flap elements 60 uncovers the flow openings 24*a* on the sub-frame 52 to allow the flow of air to take place freely from the upstream to the downstream side of the valve 10. As noted, the pivotal movement is facilitated by the rounded end 76 of the second end 66 of the retaining bar 62 and the spacing between the surface 74 of the second end of the flap element 60.

If the pressures on the upstream and downstream sides balance or a downstream over-pressure condition result, the flap elements 60 pivot back into engagement with the seat portions 56 of the sub-frame 52 to a closed condition under the force of gravity or because of the increased downstream pressure. This closes the flow openings 24*a* and, thus, prevents airflow through the valve 10.

The pressure relief valve 10 (FIGS. 3-4) includes at least one latch member 90 for securing the pressure relief valve to the opening in the body panel 20 of the vehicle 22. The latch members 90 extend from the outer surface 36, 48 of the first and second longer side walls 26, 28. Although two latch members are illustrated on each longer side wall 26, 28, those having ordinary skill will appreciate that more or fewer latch members may be positioned along the longer side walls 26, 28 and/or the shorter side walls 30, 32.

In order to accommodate the latch member 90, the peripheral wall 18 (FIG. 6) includes a first portion 92 and a second portion 94 moveable relative to the first portion. The first and second portions 92, 94 may be formed as one piece. The first portion 92 and/or the second portion 94 may be constructed to provide a water-routing scoop (not shown) for routing excess water away from the central air flow passage 24 and preventing the water from entering the passenger compartment 19.

Figure 6:
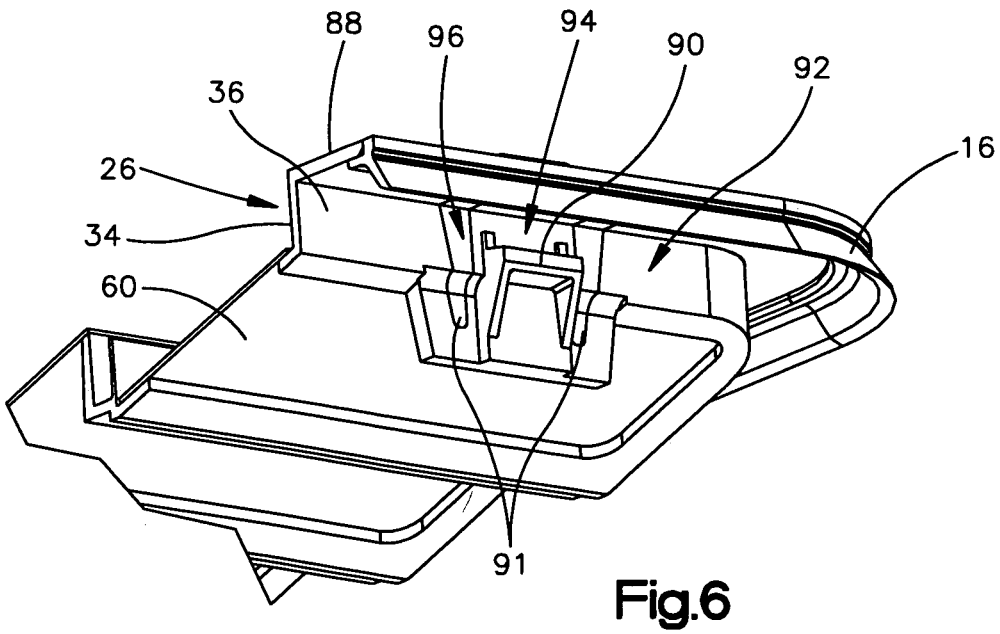
FIG. 6 is a bottom view of a portion of the pressure relief valve of FIG. 2.

As shown in FIG. 6, each of the latch members 90 is positioned on one of the second portions 94 and extends outwardly away from the outer surface 36 of the first longer side wall 26 and, thus, away from the central air flow passage 24. A flexible connecting portion 96 interconnects the first portion 92 and the second portion 94 and facilitates relative movement between the first portion and second portion.

The connecting portion 96 extends along and through each side wall 26, 28 and the flange 88. The connection portion 96 includes first legs 91 extending downwardly along both sides of the second portion 94 and, thus, extending between the first portion 92 and the second portion. Each of the first legs 91 of the connecting portion 96 may have a triangular shape, as seen in FIG. 6, although those having ordinary skill will appreciate that the first legs may exhibit alternative shapes, such as square, rectangular, arcuate, etc.

Figure 8A:
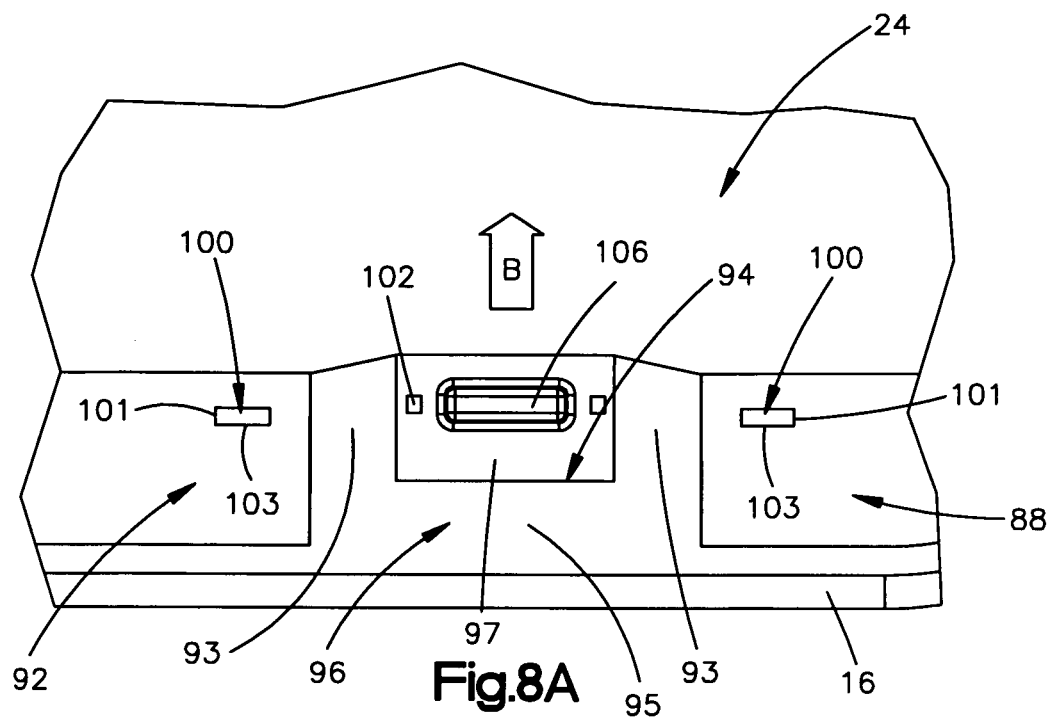
FIG. 8A is a top view of a portion of the pressure relief valve of FIG. 7A.
Figure 8B:
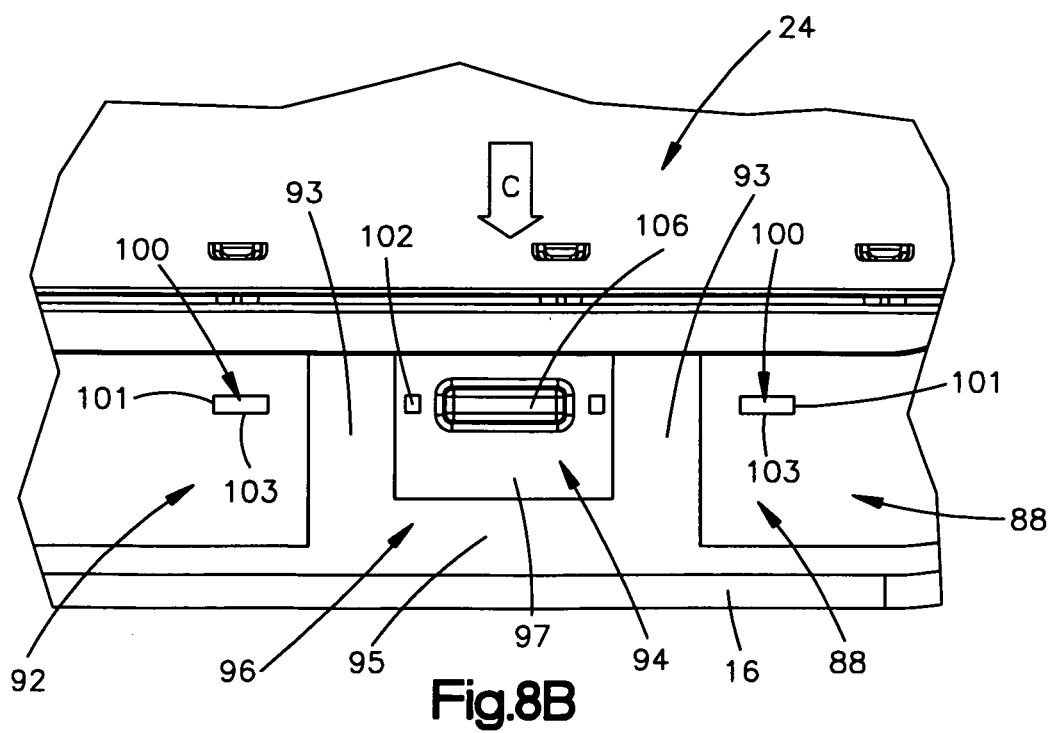
FIG. 8B is a top view of a portion of the pressure relief valve of FIG. 7B.

The first legs 91 are connected to second legs 93 positioned on either side of the second portion 94. The second legs 93 extend between the flange 88 extending from the side walls 26, 28 and a flange 97 of the second portion 94. The second legs 93 extend substantially perpendicular to each side wall 26, 28 (FIG. 2 and FIG. 8A). The first and second legs 91, 93 therefore extend substantially perpendicular to one another. Each of the second legs 93 may have a rectangular shape, as seen in FIGS. 8A-8B, although those having ordinary skill will appreciate that the second legs may exhibit alternative shapes, such as square, triangular, arcuate, etc. The second legs 93 are connected to one another by a cross-member 95 extending substantially parallel to the side walls 26, 28. Together, the first legs 91, second legs 93, and cross-member 95 substantially surround the second portion 94 and separate the second portion from the first portion 92.

The connecting portion 96 is made of any flexible material that elastically deforms to facilitate relative movement between the first portion 92 and the second portion 94. Exemplary materials for the connecting portion 96 include, for example, unsaturated rubbers such as natural rubber and chloroprene rubber, saturated rubbers such as silicone rubber, fluoroelastomers, and polyacrylic rubber, and other elastomers such as thermoplastic elastomers, thermoplastic vulcanizates, thermoplastic polyurethane, and synthetic polyisoprene, and combinations thereof.

The connecting portion 96 may be provided between the first portion 92 and the second portion 94 by any conventional methods known to those having ordinary skill. For example, the connecting portion 96 may be fastened to the first portion 92 and the second portion 94 or the connecting portion may be molded in sequence or concurrently with the first portion and the second portion. The connecting portion 96 is formed as one-piece with the seal 16 such that the connecting portion and the seal have a unitary construction, although those having ordinary skill will appreciate that the connecting portion and the seal could be separately formed and secured together via fasteners or the like.

FIGS. 7A-7B illustrate the insertion of the insert or the pressure relief valve 10 into the opening in the body panel 20 of the vehicle 22. The valve 10 is inserted into the opening with the bottom surface 40 of the side walls 26, 28 acting as the leading edge. The valve 10 is inserted into the opening in the direction indicated by the arrow A. As the side walls 26, 28, 30, 32 pass by the body panel 20, the body panel engages the latch members 90. The engagement imparts upon each latch member 90 and, thus, the second portion 94 of the peripheral wall 18 a radially inward force. Since the second portions 94 are moveable relative to the first portions 92, the radially inward force imparted by the body panel 20 upon the second portions causes the second portions to deflect inward relative to the central air flow passage 24 in the manner indicated by the arrow B. This places the second portions 94 inward of the first portions 92 and, thus, out of alignment with the first portions. The deflection may be on the order of about 2.5 mm to about 3.5 mm, although more or less deflection may occur in accordance with the present invention.

The connecting portion 96 interconnecting the first portion 92 and the second portion 94 facilitates the movement of the second portion relative to the first portion. In particular, the connecting portion 96 deforms under the influence of the inward force to accommodate the movement of the second portion 94 relative to the first portion 92. The connecting portion 96 may deform along the side walls 26, 28 and/or along the flanges 88 and 97 to accommodate the movement. The deformation may include stretching, rolling, and/or compressing, etc. depending on the particular shape and construction of the connecting portion 96.

To further facilitate the deflection of the second portion 94 relative to the first portion 92, a bend fulcrum (not shown) may be provided across the second portion and adjacent to the connection with the first portion. The bend fulcrum may constitute a portion of the second portion 94 having areas of predetermined weakness such as, for example, a thin wall portion or perforations, located in a position where the second portion is expected to deflect under the influence of the radially inward force. Those having ordinary skill will appreciate, however, that the second portion 94 may have alternative constructions that facilitate the deflection of the second portion.

Further insertion of the insert or the valve 10 in the direction A causes the valve to pass into the opening in the body panel 20 until the latch members 90 pass completely beyond the body panel (FIG. 7B). When this occurs, the body panel 20 no longer imparts a radially inward force upon the latch members 90 and, thus, the second portions 94 of the wall 18 move outward relative to the central flow passage 24 in the manner indicated by arrow C. The outward movement places the second portions 94 in substantial alignment with the first portions 92 and, therefore, places the latch members 90 into a latching position. In the latching position, the latch members 90 secure the valve 10 to the body panel 20 by placing the body panel between the flanges 88 and 97 and the latch members. In particular, the latch members 90 snap outward to engage the inner surface of the body panel 20 while the seal 16 on the flange 88 engages the outer surface of the body panel, thereby securing the valve 10 to the body panel. Placing the latch members 90 in the latching position also causes the body panel 20 to engage the outer surfaces of the side walls 26, 28, 30, 32. The engagement prevents the valve 10 from lateral displacement relative to the body panel 20 once the valve is installed.

Furthermore, as the valve 10 is inserted into the opening in the body panel 20 along the direction A, the seal 16 is forced into contact with the body panel 20 at an area peripherally adjacent the side walls 26, 28, 30, 32 of the housing 12. As the latch elements 90 move into the latching position, the seal 16 is forced to spread outwardly and parallel relative to the body panel 20. The function of the seal 16 is to help seal the connection between the pressure relief valve 10 and the body panel 20 of the vehicle 22 against air, water, dust, and foreign matter from passing through the opening in the body panel except through the central air passage 24.

At least one indicator 100 (FIGS. 8A-8B) may be provided to indicate when the latch member 90 is in the latching position. In particular, the indicator 100 provides a visual indication that the latch element 90 is either in the latching position or not in the latching position. The indicator 100 is visible along the direction A when the insert or the pressure relief valve 10 is in the opening in the body panel 20 of the vehicle 22. As shown in FIGS. 8A-8B, the indicator includes a plurality of indicators 100 on the first portion 92 and a plurality of indicators 102 on the second portion 94. The indicators 100, 102 may constitute colored or uncolored shapes, protrusions, indentations or otherwise any other means by which the indicators can be visually observed in the direction A.

Each of the indicators 100 extends generally parallel to the side walls 26, 28 and includes a first shorter side 101 and a second longer side 103. Although the indicators 100 are illustrated as being rectangular, those having ordinary skill will appreciate that the indicators could likewise exhibit alternative constructions, such as oval, triangular, square, circular, etc.

The indicators 100, 102 are positioned on the flanges 88 and 97 of first portion 92 and the second portion 94, respectively, such that, when the insert or the valve 10 is in an initial, un-mounted condition, the indicators are substantially aligned with one another. As the insert or the valve 10 is inserted through the opening in the body panel 20, the body panel causes the latch elements 90 and, thus, the second portions 94 to deflect inwards in the direction B relative to the first portions 92 (FIG. 8A). Since the indicators 102 are positioned on the second portion 94, the indicators 102 move with the second portion relative to the first portion 92 and, thus, relative to the indicators 100 on the first portion. Accordingly, the inward movement of the second portion 94 causes the indicators 102 on the second portion to become misaligned with the indicators 100 on the first portion 92 (FIG. 8A). The misalignment of the indicators 102 with the indicators 100 indicates that the latch elements 90 are not in the latching position, i.e., that the latch elements have not passed through the opening in the body panel 20 and properly engaged the body panel.

As the latch elements 90 pass through the body panel 20 the latch elements and, thus, the second portions 94 move outwards in the direction shown by the arrow C relative to the air flow passage 24. The indicators 102 on the second portions 94, therefore, also move outwards. When the latch members 90 pass fully through the body panel 20 and reach the latching position, the body panel engages the second portions 94 and prohibits further outward movement of the second portions and, thus, the latch members. As shown in FIG. 8B, when the latch members 90 are placed in the latching position, the indicators 100 on the first portions 92 are aligned with the indicators 102 on the second portions 94.

The indicators 100, 102, therefore, provide visual indication to the individual installing the insert or the pressure relief valve 10 that each latch element 90 is in the latching position and, thus, that the insert is secured to the body panel 20 of the vehicle 22. On the other hand, if the individual installing the insert or the pressure relief valve 10 sees that the indicators 100, 102 are misaligned and, thus, that the insert is not secured to the body panel 20, appropriate action can be taken to correctly install the insert in the body panel.

The insert or the pressure relief valve 10 may also be configured for easy removal from the body panel 20 of the vehicle 22. The pressure relief valve 10 is removed from the body panel 20 by placing the latch elements 90 into an unlatched position, i.e., a position in which the latch elements are moved inward relative to the air flow passage 24. By placing the latch elements 90 in a position in which the latch elements are moved inward relative to the air flow passage 24, the pressure relief valve 10 can be removed from the body panel in a direction opposite the direction A in which the pressure relief valve is installed within the body panel.

As noted, the indicators 102 on the second portions 94 may be configured as tab or slots. The indicators 102, therefore, may be engageable manually or by tools in order to move the second portions 94 in the direction shown by the arrow B (FIG. 8A) relative to the first portions 92 such that the latch elements 90 are placed in the unlatched position. Alternatively or additionally, a larger tab 106 may be provided on the second portion 94 which, again, may be engaged manually or with tools to place the latch element 90 in the unlatched position. The larger tab 106 may also be used as an indicator to indicate that the latch member 90 is in the latching position. Once the latch element 90 is placed in the unlatched position, the insert or pressure relief valve 10 can be removed from the body panel 20 of the vehicle 22 by pulling the pressure relief valve in the direction opposite the insertion or installation direction A.

Although the insert is shown as having an air flow passage 24, it is contemplated that the insert may not have an air flow passage. The insert may be used to plug an opening in the vehicle if the insert does not have an air flow passage.

From the above description of the invention, those skilled in the art will perceive improvements, changes and modifications. Such improvements, changes and modifications within the skill of the art are intended to be covered by the appended claims.

Having described the invention, the following is claimed:
1. An insert for an opening in a base, the insert comprising:
a housing having a peripheral side wall defining an interior space and including at least one latch member having a latching position, the peripheral side wall including a first portion and a second portion defining the interior space, the second portion moving relative to the first portion during insertion of the insert into the base, the at least one latch member being disposed on the second portion, the latch member engaging the base to secure the housing in the opening when the latch member is in the latching position, the housing being inserted into the opening in a first direction to engage the latch member with the base; and at least one indicator assembly moving with the at least one latch member to show when the at least one latch member is in the latching position, the at least one indicator assembly being visible in the first direction when the insert is in the opening in the base, wherein the at least one indicator assembly includes a plurality of indicators on the first and second portions of the peripheral side wall, the indicators on the first portion being aligned with the indicators on the second portion when the at least one latch member is in the latching position and being misaligned when the at least one latch member is not in the latching position, the peripheral side wall further includes a flexible connecting portion that continuously interconnects the first portion and the second portion and is formed of a different material than the first portion and the second portion.

2. The insert recited in claim 1, wherein the connecting portion includes arcuate members on opposing sides of each latch member and extending between the first and second portions, the arcuate members allowing for relative movement between the second portion and the first portion.

3. The insert recited in claim 1 further including a flange that extends substantially perpendicular to the first portion and the second portion and engages the base.

4. The insert recited in claim 3 further comprising a flexible connecting portion interconnecting the first portion and the second portion and having a cross-member that extends along the flange in a substantially coplanar manner to allow for relative movement between the second portion and the first portion.

5. The insert recited in claim 3, wherein the flange includes a seal that seals the opening from contaminants.

6. The insert recited in claim 1, wherein the at least one latch member extends away from the interior space.

7. The insert recited in claim 1, wherein the opening is in a base of a motor vehicle.

8. The insert recited in claim 1, wherein the plurality of indicators includes an indicator on the second portion and at least two indicators on the first portion.

9. The insert recited in claim 1, wherein the indicators include a plurality of tabs extending in a direction opposite the first direction.

10. The insert recited in claim 1, wherein the interior space defines an air flow passage through the housing.

11. The insert recited in claim 10 further including at least one valve element connected to the housing, the valve element having a closed condition overlying the air flow passage to prevent air flow through the air flow passage and an open condition permitting airflow through the air flow passage, the at least one valve element moving from the closed condition to the open condition in response to differential pressure across the at least one valve element.

12. The insert recited in claim 1, wherein the insert prevents air flow through the opening.

13. The insert recited in claim 1, wherein the peripheral side wall includes a portion facing opposite the first direction that is engaged to move the latch member out of the latching position to remove the housing from the opening in a second direction opposite the first direction.

14. An insert for an opening in a base, the insert comprising:

a housing having a peripheral side wall defining an airflow passage through the housing, the peripheral side wall comprising a first portion and a second portion defining the airflow passage and the insert capable of controlling airflow through the airflow passage, the second portion moving relative to the first portion when the insert is placed in the opening in the base; and at least one latch member disposed on the second portion and having a latching position, the latch member engaging the base to secure the housing in the opening when the latch member is in the latching position, the housing being inserted into the opening in a first direction to engage the at least one latch member with the base;

the second portion of the peripheral side wall having a first position inward of the first portion to allow the housing to be inserted into the opening and a second position substantially aligned with the first portion to place the at least one latch member in the latching position and secure the housing in the opening, the second portion moving from the first condition to the second condition as the housing is inserted into the opening along the first direction, wherein the peripheral side wall further includes a flexible member interconnecting the first portion and the second portion and is formed of a different material than the first portion and the second portion, the flexible member continuously connecting the first portion and the second portion and therefore preventing contaminants from entering an interior space defined by the peripheral side wall.

15. The insert recited in claim 14, wherein the opening is in a base of a motor vehicle.

16. The insert recited in claim 14, wherein the connecting portion includes arcuate members on opposing sides of each latch member and extending between the first and second portions, the arcuate members allowing for relative movement between the second portion and the first portion.

17. The insert recited in claim 14 further including a flange that extends substantially perpendicular to the first portion and the second portion and engages the base.

18. The insert recited in claim 17, wherein the flange includes a seal that seals the opening from contaminants.

19. The insert recited in claim 14, wherein the at least one latch member extends away from the interior space.

20. The insert recited in claim 14 further including at least one indicator moving with the at least one latch member to show when the at least one latch member is in the latching position, the indicator being visible in the first direction when the insert is in the opening in the base.

21. The insert recited in claim 20, wherein the at least one indicator includes a plurality of indicators on the first and second portions of the peripheral side wall, the indicators being aligned when the at least one latch member is in the latching position and being misaligned when the at least one latch member is not in the latching position.

22. The insert recited in claim 21, wherein the plurality of indicators includes an indicator on the second portion and at least two indicators on the first portion.

23. The insert recited in claim 21, wherein the indicators include a plurality of tabs extending in a direction opposite the first direction.

24. The insert recited in claim 14, wherein the interior space defines an air flow passage through the housing.

25. The insert recited in claim 24 further including at least one valve element connected to the housing, the valve element having a closed condition overlying the air flow passage to prevent air flow through the air flow passage and an open condition permitting airflow through the air flow passage, the at least one valve element moving from the closed condition to the open condition in response to differential pressure across the at least one valve element.

26. The insert recited in claim 14, wherein the insert prevents air flow through the opening.

27. The insert recited in claim 14, wherein the peripheral side wall includes a portion facing opposite the first direction that is engaged to move the latch member out of the latching position to remove the housing from the opening in a second direction opposite the first direction.

28. The insert recited in claim 1, wherein the first portion and the second portion of the peripheral wall are substantially coplanar when the latch member is in the latching position.

29. The insert recited in claim 14, wherein the first portion and the second portion of the peripheral wall are substantially coplanar when the latch member is in the latching position.

\* \* \* \* \*